United States Patent [19]

Malosh

[11] Patent Number: 4,750,970
[45] Date of Patent: Jun. 14, 1988

[54] PLASTIC SHEET SEALING/WELDING MACHINE

[76] Inventor: Peter G. Malosh, 1952 W. Evergreen, Chicago, Ill. 60622

[21] Appl. No.: 887,465

[22] Filed: Jul. 21, 1986

[51] Int. Cl.$^4$ .............................................. B32B 31/16
[52] U.S. Cl. ............................... 156/580.1; 156/73.4; 248/661
[58] Field of Search ................. 156/73.4, 580.1, 580.2, 156/73.1; 104/91, 93, 118, 120, 121; 105/150; 248/646, 661, 424

[56] References Cited

U.S. PATENT DOCUMENTS

| | | | |
|---|---|---|---|
| 3,445,307 | 5/1969 | Balamuth et al. | 156/580.1 |
| 3,616,064 | 10/1971 | Long et al. | 156/580.2 |
| 3,687,786 | 8/1972 | Williams et al. | 156/580.1 |
| 3,774,311 | 11/1973 | Stemple | 105/150 |
| 4,480,157 | 10/1984 | Ishikura et al. | 191/34 |

*Primary Examiner*—Donald E. Czaja
*Assistant Examiner*—Lori Cuervo
*Attorney, Agent, or Firm*—Thomas R. Vigil

[57] ABSTRACT

A machine for gas-free sealing/welding of overlapping edges of thermoplastic material is provided and is of the type which includes a framework carrying an ultrasonic transducer horn assembly having a hammer at a lower end thereof. An anvil is positioned below the hammer. A mounting mechanism for mounting the framework for side-to-side movement, and a drive mechanism for moving the framework on the mounting mechanism are also provided. The improvement resides in the mounting mechanism comprising a beam which extends between spaced apart support members and which has at least one upper rail edge and one lower rail edge and wheels rotatably mounted to the framework and including at least one upper wheel and at least one lower wheel which engage, respectively, the upper and lower edges.

Preferably the beam is an I beam mounted on its side with a middle plate portion resting on the support members and transverse end portions of the I beam each having an upper rail edge and a lower rail edge, and the wheels comprise at least two upper wheels and at least two lower wheels mounted to the framework and engaging respective rail edges.

Additionally, an adjustable stop mechanism including a shock absorber is provided, with a mechanism for adjusting the generally vertical position of the shock absorber for adjusting the distnce between the hammer and the anvil also being provided.

26 Claims, 4 Drawing Sheets

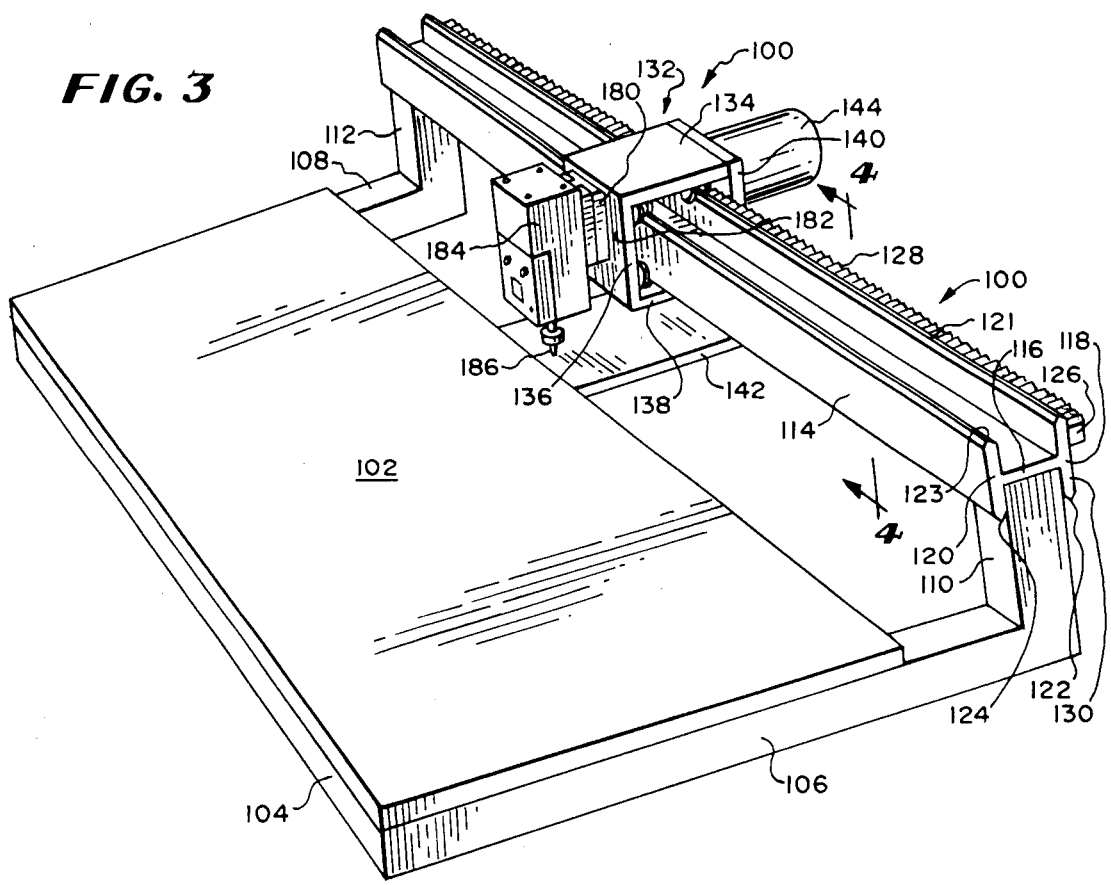
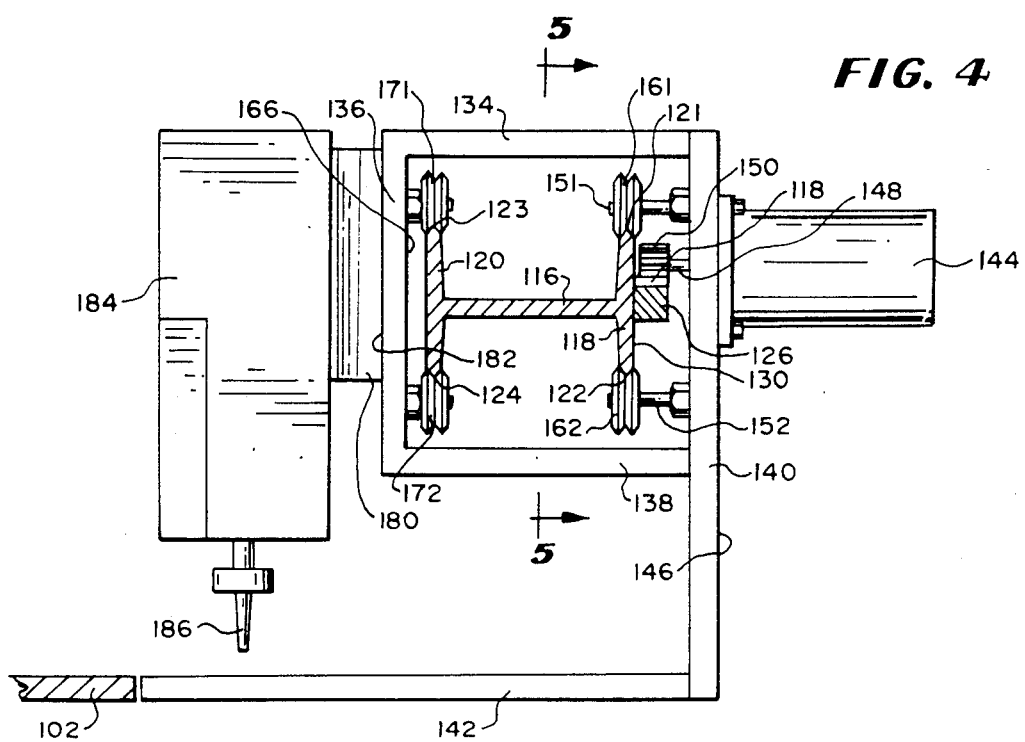

PLASTIC SHEET SEALING/WELDING MACHINE

BACKGROUND OF THE INVENTION

1. Field of the Invention

The present invention relates to a machine for sealing/welding overlapping or superimposed edges of sheets of thermoplastic material and more specifically to an improved guiding and mounting mechanism for a movable framework of the machine.

2. Description of the Prior Art

Heretofore machines for sealing/welding overlapping or superimposed edges of sheets of thermoplastic material have been manufactured and sold. Such prior machines employ expensive mechanisms for mounting and guiding a movable framework of the machine. One machine employed cylindrical bars for mounting and guiding the movable framework and was found to be deficient as a result of sagging of the bars due to the weight of the framework.

As will be described in greater detail hereinafter, the machine of the present invention provides a number of advantages over the prior machines by providing a simple and inexpensive mechanism for guiding and mounting the movable framework which does not sag and by providing mechanisms for cushioning downward movement of a hammer of an ultrasonic transducer horn assembly mounted on the movable framework and for accurately and simply adjusting the distance between the hammer and an anvil of the machine.

SUMMARY OF THE INVENTION

According to the invention there is provided in a machine for gas-free sealing/welding of overlapping edges of thermoplastic material of the type which includes a framework carrying an ultrasonic transducer horn assembly having a hammer at a lower end thereof, an anvil positioned below the hammer, mounting means for mounting the framework for side-to-side movement, and drive means for moving the framework on the mounting means, the improvement residing in said mounting means comprising a beam which extends between spaced apart support members and which has at least one upper rail edge and one lower rail edge and wheel means rotatably mounted to said framework and including at least one upper wheel and at least one lower wheel which engage, respectively, said upper and lower edges.

Preferably, the beam is an I beam mounted on its side with a middle plate portion resting on said support members and transverse end portions of said I beam each having an upper rail edge and a lower rail edge, and said wheel means comprise at least two upper wheels and at least two lower wheels mounted to said framework and engaging respective rail edges.

Additionally vertical stop means for the hammer including a shock absorber, and means for adjusting the generally vertical position of said shock absorber for adjusting the distance between said hammer and said anvil are provided.

BRIEF DESCRIPTION OF THE DRAWINGS

FIG. 3 is a perspective view of one embodiment of the machine of the present invention for gas-free sealing or welding of overlapping edges of thermoplastic material and shows a rectangular framework mounted by means of rollers on a horizontally extending I beam, an elongate rack mounted on the I beam and a pinion on the end of a shaft of a motor mounted to the framework, the pinion engaging the rack, and a transducer horn assembly mounted on the front of the framework and having a hammer at the lower end thereof which is positioned adjacent an anvil that is mounted to and is carried with the framework.

FIG. 4 is a vertical sectional view through the I beam and rack, is taken along line 4—4 of FIG. 3, and shows one set of rollers which engage the I beam.

DESCRIPTION OF THE PRIOR ART MACHINES

Figure 1:
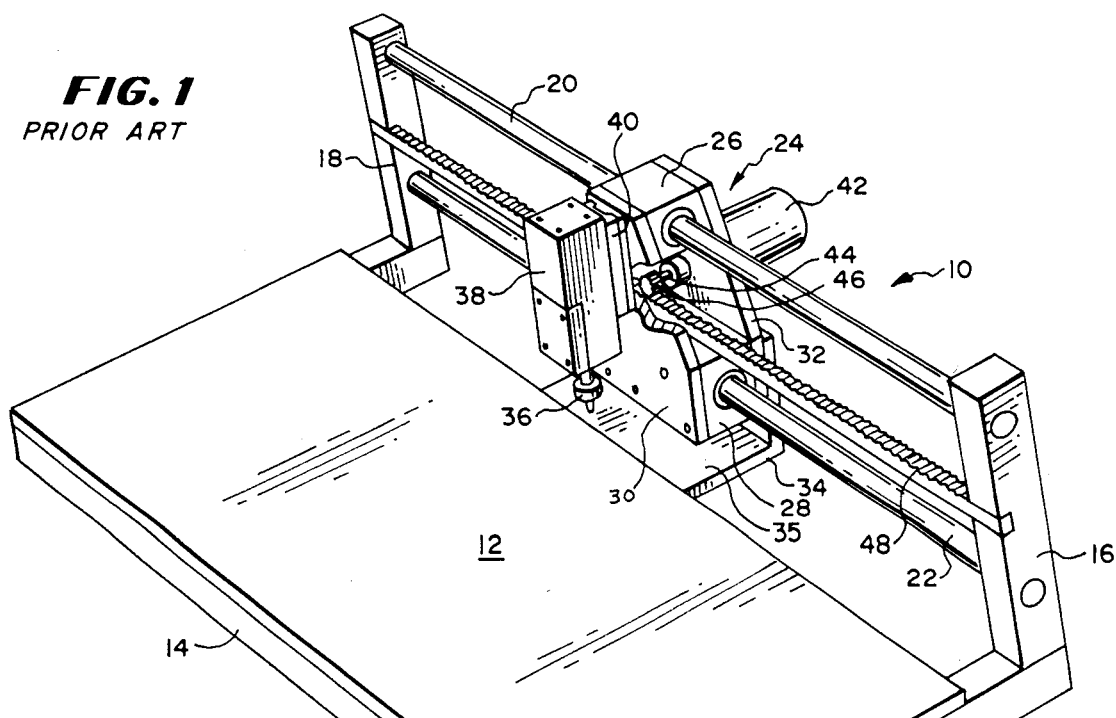
FIG. 1 is a perspective view of a prior art machine for gas-free sealing or welding of overlapping edges of thermoplastic material and shows a framework of the machine mounted for sliding horizontal movement on two vertical bars, a rack extending parallel to the guide bars, a pinion on a shaft of a motor in position to engage the rack for causing reciprocal movement of the framework on the bar, and a sonic welding head including a hammer mounted to the framework and which is juxtaposed over an anvil which is fixed to and extends from the framework.

Referring now to FIG. 1 there is illustrated therein a prior art machine 10 for ultrasonically sealing or welding, in a gas-free manner, overlapping edges of sheets of thermoplastic material that are positioned on a table 12 of the machine 10. The machine 10 includes a framework 14 for supporting the table 12, such framework 14 having two spaced apart upright arms 16 and 18. Mounted to and extending between the arms 16 and 18 are upper and lower spaced apart parallel guide bars 20 and 22.

The machine 10 further includes a movable framework 24 including an upper sleeve bearing mechanism 26 which is mounted on the upper guide bar 20 and a lower sleeve bearing mechanism 28 mounted on the lower guide bar 22.

A first or front plate 30 is fixed, on one side of the guide bars 20, 22, to the upper and lower bearing mechanisms 26, 28. Likewise a second or back plate 32 is fixed to the upper and lower bearing mechanisms 26, 28 on the backside of the framework 14.

Then, an L-in-cross-section plate 34 is fixed to the second or back plate 32 and extends vertically downwardly and then horizontally forwardly therefrom to form an anvil 35 for a hammer 36 of an ultrasonic transducer horn assembly 38 mounted on a slide mechanism 40 which in turn is mounted on the front plate 30.

A motor 42 is mounted to the back plate 32 and has a shaft 44 extending through the back plate 32. A pinion 46 is mounted on the shaft which engages an elongate upwardly facing rack 48 which is fixed to and extends between the arms 16 and 18.

Insulated wire conductors (not shown) are coupled between the transducer horn assembly 38 and a control unit (not shown) and between the motor 42 and the control unit (not shown) whereby an operator can manipulate switches (not shown) on the control unit for controlling the frequency of operation of the transducer horn assembly 38 and the energization of (and direction of shaft rotation of) the motor 42 for reciprocating the framework 14 side-to-side.

In use, a first sheet of transparent thermoplastic material is placed upon the table 12. Then, a document to be sealed in a gas-free manner between the first lower sheet and an upper second sheet is placed upon the first lower sheet. Next, the second upper sheet is placed over the document and the lower first sheet and once aligned, a blanket of relatively heavy bars, which can be magnetic, encased in an elastomeric material having living hinges between adjacent bars is placed over the upper sheet to hold the sheets and document sandwiched therebetween in place. This, of course, is after the forward overlapping marginal edges of the upper and lower sheets of transparent thermoplastic material are situated along a line to be traversed by the hammer 36 of the transducer horn assembly 38 when the framework 24 is moved from right to left or left to right on the guide bars 20, 22.

Before a sealing operation, the thickness of the sheets of plastic material is first determined and then the height of the hammer 36 above the anvil 35 is adjusted, such as by means of a screw adjustment.

Once this alignment has been completed, the operator energizes the tranducer horn assembly 38 and the motor 42 to cause the motor 42 to move the framework 24 at a desired rate of speed along the rack 48 and on the guide bars 20, 22 while the hammer 36 of the transducer horn assembly 38 is moving at an ultrasonic frequency of, for example, 40,000 KHz.

The machine 10 worked satisfactorily but at times, due to sagging of the guide bars 20, 22 and the rack 48, due to the weight of the framework 24 and parts mounted thereon, the sealing was not fully satisfactory.

Figure 2:
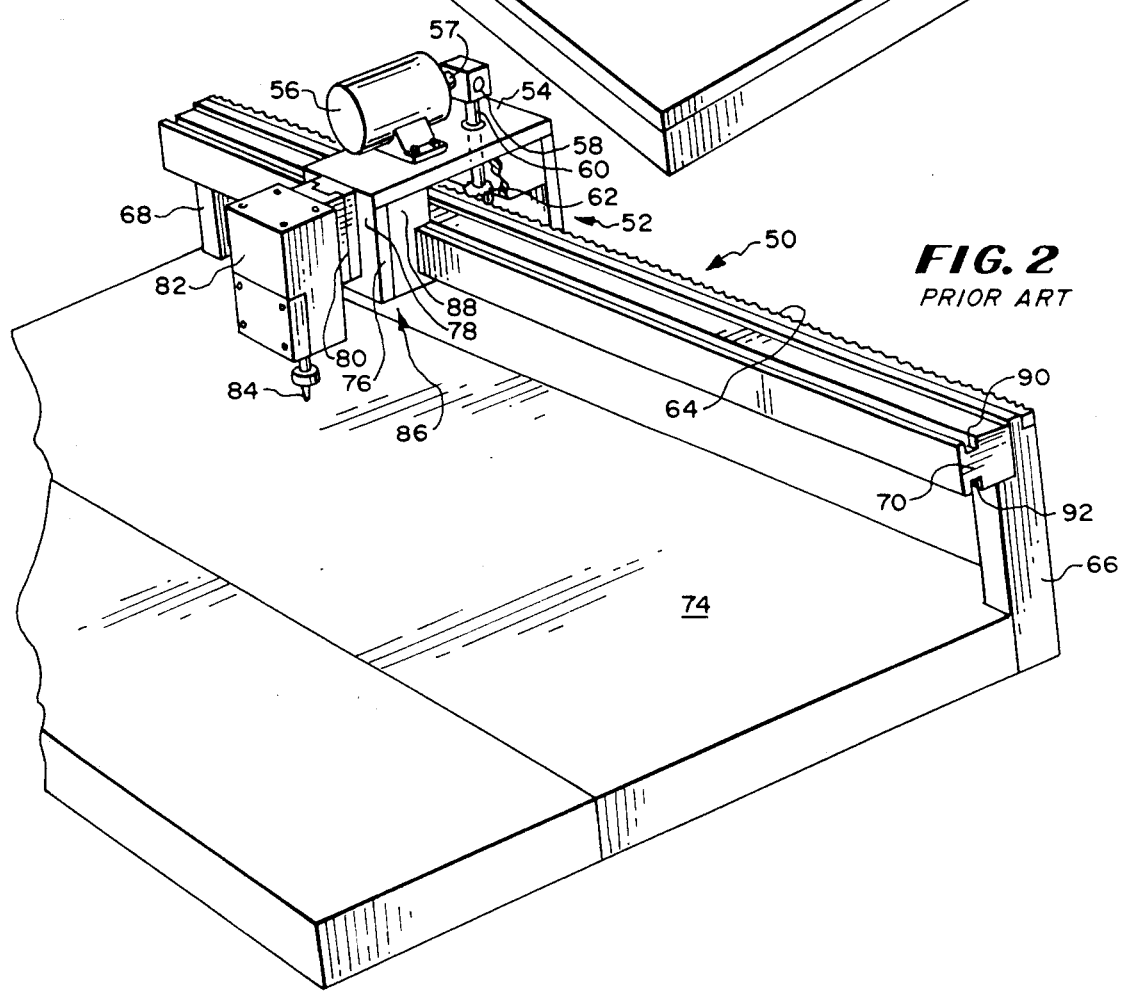
FIG. 2 is a perspective view of another prior art machine for gas-free sealing or welding of overlapping edges of thermoplastic material and shows an elongate bar on which a framework is mounted, the elongate bar having upper and lower elongate grooves, a unirail mechanism which engages the upper and lower grooves, a motor mounted on top of the framework and coupled through a gear mechanism to a pinion which engages a rack mounted adjacent the elongate bar and a transducer horn assembly mounted on the framework and having a hammer on the lower end thereof which engages an anvil forming platform on which the sheets of plastic material are positioned.
Figure 5:
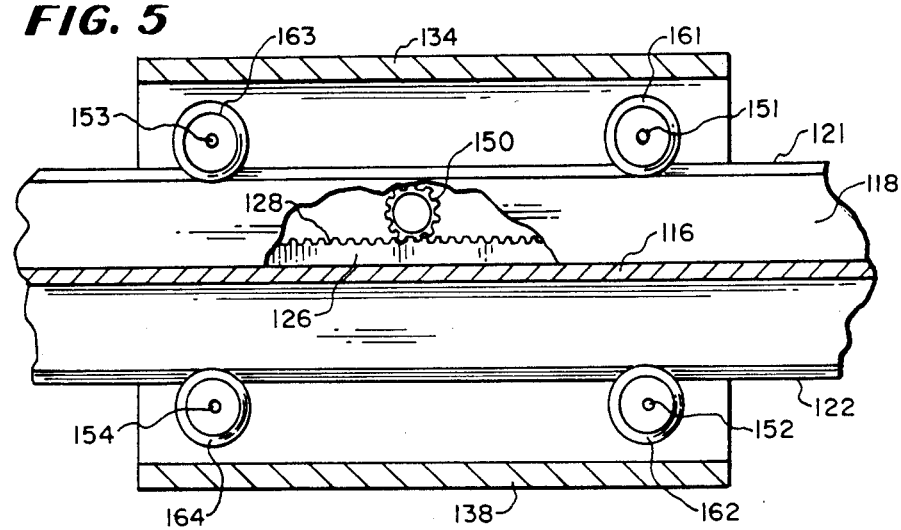
FIG. 5 is a vertical sectional view through the framework of the machine and is taken along line 5—5 of FIG. 4.

In FIG. 2 there is illustrated another machine 50 including a generally U-shaped movable framework 52 which has a top platform 54 on which is mounted a motor 56. A shaft 57 of the motor 56 extends at a slight angle upwardly from the horizontal toward the backside of the machine 50 and is connected to a gearbox 58 mounted on the platform 54. The gearbox 58 has a generally vertically extending shaft 60 which extends outwardly and downwardly at an angle of 90° to the motor shaft 57 and is connected to a pinion gear 62 which engages an elongate rearwardly (horizontally) facing rack 64 fixed to and extending between upstanding arms 66 and 68, similar to arms 16 and 18 shown in FIG. 1. A generally square-in-cross-section beam 70 also extends between and is fixed to the two upwardly extending arms 66 and 68.

The lower ends of the arms 66 and 68 are connected to a table 74 which also serves as an anvil 74 and on which is placed the two sheets of thermoplastic material with a document therebetween for sealing the overlapping marginal edges of the sheets in a gas-free manner.

At the front side of the framework 52 is a front plate 76 which extends downwardly and which has a forward face 78 upon which is mounted a slide mechanism 80 of the type made and sold by Nippon Thompson Co. Ltd of Tokyo, Japan under the trademark IKO Cross Roller Way. To this slide mechanism 80 is mounted an ultrasonic transducer horn assembly 82 of the type made and sold by Dukane Corporation of St. Charles, Ill. The ultrasonic transducer horn assembly 82 has a hammer 84 at the lower end thereof.

Mounted to the inner face (hidden from view) of the front plate 76 is a unirail mechanism 86 which includes a C-shaped block member 88 that travels on an upper track 90 and a lower track 92 in the beam 70. The unirail mechanism 86 is generally C-shaped in cross section to enable upper and lower ball bearing mechanisms (not shown) in the block member 88 to engage and travel in the upper and lower tracks 90, 92. The unirail mechanism 86 is of the type made and sold by Nippon Thompson Co. L.T.D. of Tokyo, Japan.

The machine 50 including the square-in-cross-section beam 70 and the unirail mechanism 86 also worked satisfactorily but was relatively expensive. The square beam 70 solved the problem of sagging. However, provision of the gear reducer 58 and the additional shaft 60 to the pinion gear 62 plus the unirail mechanism 86 significantly increased the price of the machine. As will be described hereinafter in connection with the description of FIGS. 3–9, a machine (100 in FIG. 3) constructed according to the teachings of the present invention solves the problem of sagging and yet at the same time provides an inexpensive mounting guide and drive mechanism which substantially reduce the cost of the machine without any loss in effectiveness, efficiency or accuracy of sealing.

DESCRIPTION OF THE PREFERRED EMBODIMENTS

Referring now in greater detail to FIG. 3, there is illustrated therein a machine 100 constructed according to the teachings of the present invention for sealing or welding in a gas-free manner the overlapping marginal edges of two sheets of thermoplastic material which are preferably clear and which preferably have a document fixed therebetween.

The machine 100 includes a table 102 mounted on a U-shaped framework 104 having first and second legs 106, 108 and first and second arms 110, 112 extending upwardly 90° from said legs 106, 108. Mounted on and extending between the upper ends of the arms 110, 112 is an extruded aluminum I beam 114. The I beam 114 has a middle bar portion 116 and two transverse bar portions 118, 120 at each end of the middle bar portion 116. The I beam 114 is positioned with the "I" on its side so that the middle plate portion 116 rests on top of the arms 110, 112. The transverse plate portions 118 and 120 have four elongate edges 121, 122, 123 and 124 which are machined to a generally V cross section.

A bar 126 having an upper sawtooth rack formation 128 is fixed to an outer side surface 130 of the transverse plate portion 118.

Supported on and extending around the I beam 114 is a rectangular framework 132 including a top plate 134, a front plate 136, a bottom plate 138 and a back plate 140 which has a portion that extends below the framework 132 to, and is fixed to, a transverse plate 142 that forms an anvil 142.

A motor 144 is mounted to a back surface 146 of the back plate 140 and has a shaft 148 which extends through the plate 140 and which has a pinion gear 150 mounted on the end thereof and positioned to engage the rack formation 128.

According to the teachings of the present invention, four stub shafts 151-154 (FIG. 5) are mounted to an inner surface 156 of the back plate 140. Each shaft 151-154 has a guide wheel 161, 162, 163 or 164 mounted thereon. The guide wheels 161-164 can be of the type disclosed in U.S. Pat. No. 3,681,431 and sold by Bishop-Wisecarver Corporation of Pittsburgh, Calif.

In like manner, four guide wheels are mounted to an inner surface 166 of the front plate 136, two of which, 171 and 172, are shown in FIG. 4.

Each guide wheel 161-164, 171, 172 has a V groove therein for receiving and riding on one of the V-in-cross-section edges 121-124.

The I beam 114, the edges 121-124 and the wheels 161-164, 171, 172 mounted to the framework 132 provide a simple and inexpensive mechanism for guiding the framework 132 back and forth on the I beam 114 with the motor 144, pinion gear 150 and rack formation 128 providing a drive mechanism for moving the framework 132 back and forth.

Preferably, the motor 144 is a variable speed stepper motor 144 of the type made and sold by Bodine Electric Company of Chicago, Ill. Such a motor has a programmable step rate, a programmable step direction, a programmable number of steps or any combination thereof.

The guide wheels 161-164, 171, 172 can be made of metal or hard plastic, such as nylon.

As shown in FIGS. 3 and 4, a roller slide mechanism 180 of the type made by Nippon Thompson Co., Ltd. is mounted to a front surface 182 of the front plate 136. Then an ultrasonic transducer horn assembly 184 having a depending hammer 186 of the type made and sold by Dukane Corporation is mounted to the roller slide mechanism 180 above the anvil 142.

In use two sheets of thermoplastic material, typically transparent, with a document sandwiched therebetween are positioned on the table 102 with overlapping, i.e., superimposed, margins along one edge of the assembly of sheets being positioned over the anvil 142. Then the horn assembly 184 is energized and the motor 144 energized to cause the framework 132 to traverse the superimposed margins so that the ultrasonic horn assembly 184 can seal or weld the margins together without generating any gases, i.e., in a gas-free manner.

Figure 6:
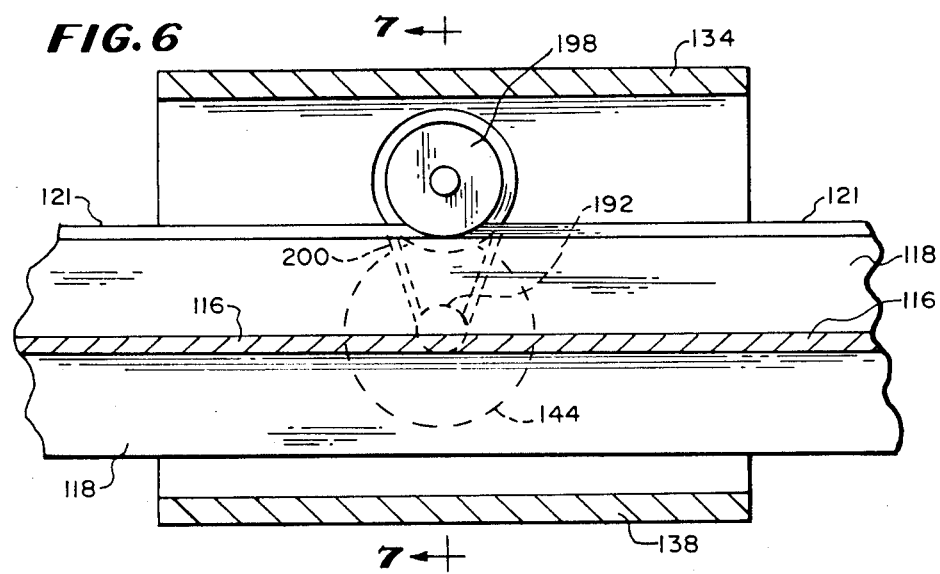
FIG. 6 is a sectional view, similar to FIG. 5, of a modified embodiment of the machine of the present invention and shows a drive mechanism for moving the framework of the machine on the I beam including a roller engaging one edge of the I beam, a pulley, a belt and a pulley mounted at the end of a shaft of a drive motor for the machine.
Figure 7:
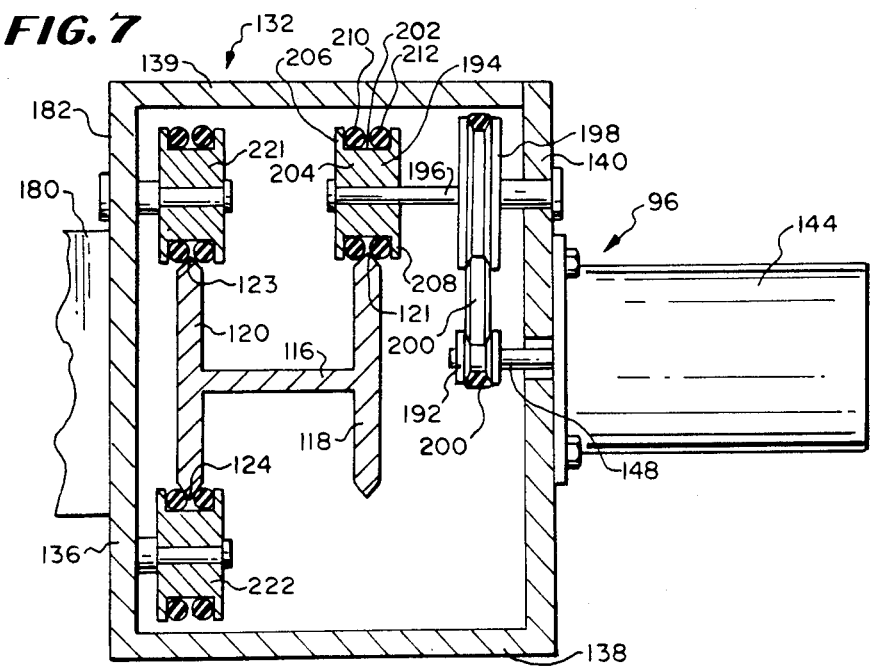

Referring now to FIGS. 6 and 7, a modified drive mechanism 190 is illustrated therein. In this modification, the drive mechanism includes the motor 144 and shaft 148 and a pulley 192 mounted on the end of the shaft 148 with only one upper wheel 194 riding on the upper rail edge 121. The wheel 194 is fixed to a stub shaft 196 which is journalled to the back plate 140.

The drive mechanism further includes a pulley 198 on the stub shaft 196 and a belt 200 trained over the pulleys 192 and 198.

In this embodiment, the bar 126 and rack formation 128 and pinion gear 150 are replaced by the pulleys 192 and 198 and the belt 200.

Also, instead of four guide wheels 161-164, one drive wheel 194 is provided.

Additionally, it will be noted that the wheel 194 is modified. Here the wheel 194 includes an annular U shaped groove 202 defined above a drum portion 204 and between two rim portions 206 and 208. Then two elastomeric O-rings 210 and 212 are received tightly on the drum portion 204, abutting each other or with a small space between them. The annular area between the O-rings 210, 212 is arranged to receive the rail edge 121 and ride on same.

Four substantially identical guide wheels, two of which, 221 and 222, are shown in FIG. 7, are mounted to the front plate 136 to provide a mechanism for guiding and mounting the framework 132 on the rail edges 123 and 124.

This modified embodiment is preferred since the "give" of the elastomeric O-rings 210 and 212 on the wheel 194, allows greater tolerances between the wheels 194, 210 and 212 and the rail edges 121, 123 and 124 and the modifications in toto are less expensive than the wheels 161-164, 171 and 172 and bar 126 with rack formation 128 and pinion gear 150.

Figure 8:
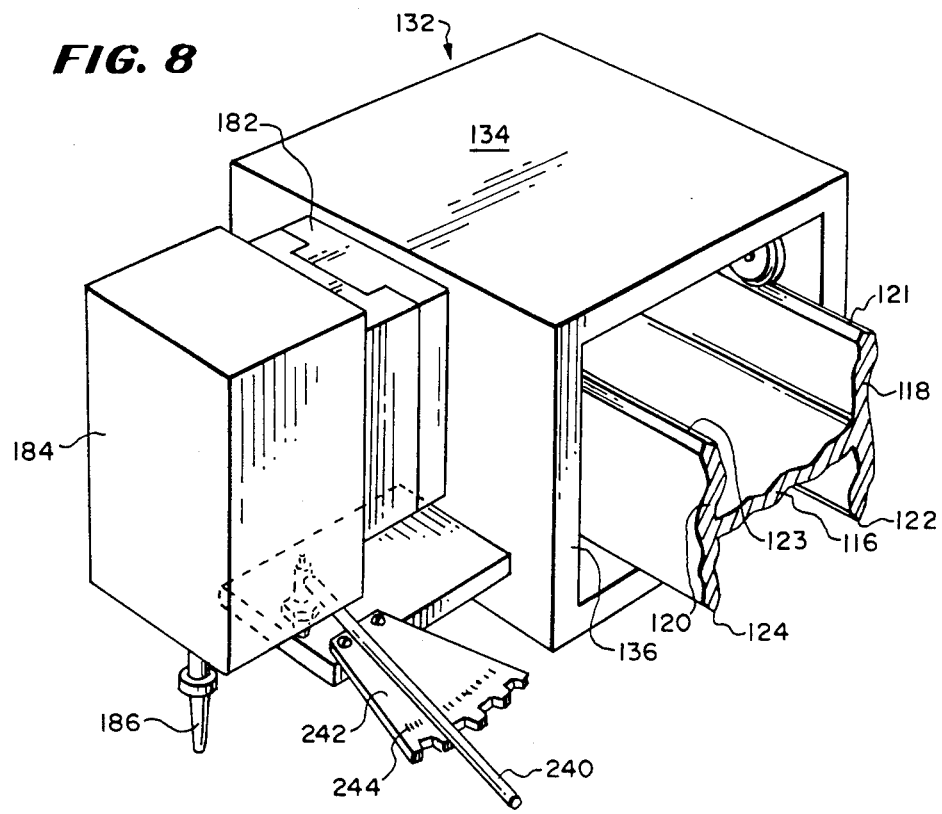
FIG. 8 is a perspective view of the machine shown in FIGS. 3 or 7 and shows part of a combined hammer height positioning and shock absorber mechanism.
Figure 9:
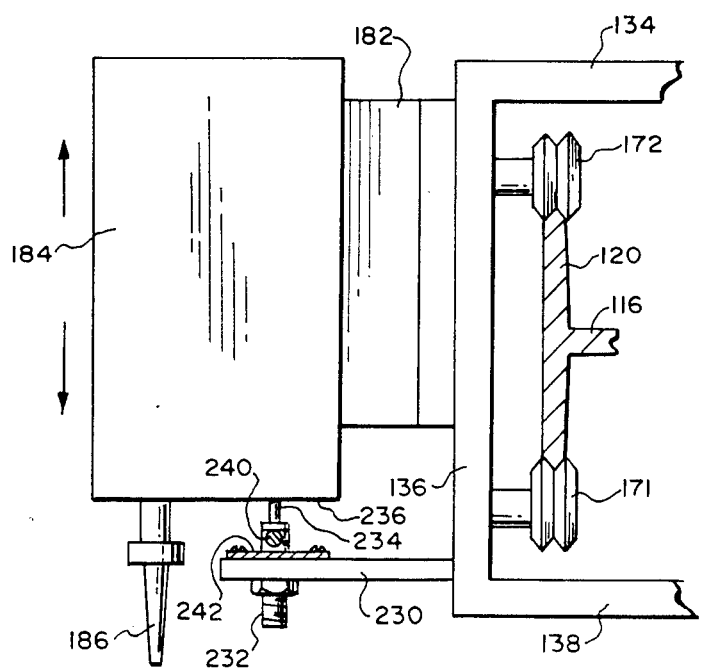
FIG. 9 is a vertical side view of the machine similar to the view shown in FIG. 4 with portions broken away and shows parts of the combined hammer height positioning and shock absorbing mechanism.

FIGS. 8 and 9 illustrate additional improvements to the machine 100. Here a short plate 230 is fixed to the front plate 136 and extends under the transducer horn assembly 184 to provide a stop for limiting downward movement of the horn assembly 184.

For this purpose, an hydraulic shock absorber 232 of the type sold by Enidine Incorporated of Orchard Park, N.Y., Model TK 21-1, TK 21-2 or TK 21-3 is mounted on the plate 230 and has a cushioning pin 234 extending upwardly from the plate 230 for engaging an underside 236 of the horn assembly 184.

The shock absorber 232 has a threaded outer surface which is threadedly received in a threaded bore (not shown) in the plate 230.

The position of the pin 234 is adjustable by means of a lever arm 240 fixed to and extending outwardly from the shock absorber 232. In this respect, lateral horizontal movement of the arm 240 will rotate the shock absorber 232 to cause it to thread upwardly or downwardly in the threaded bore and move upwardly or downwardly.

An indicia plate 242 is fixed to the top surface of the plate 230 and extends outwardly therefrom. Indicia 244 on the plate 242 enable an operator to know what the distance is between the hammer 186 and the anvil 142 and to adjust that distance for different thicknesses of the sheets of thermoplastic material. For example, for a standard thread used on the shock absorber 232, 11.25° of rotation of the shock absorber 232 equals 0.001 inch vertical movement.

The shock absorber 232 cushions the rapid movement of the hammer 186 and accidental jarring of the machine 100, i.e., raising and rapid lowering of the transducer horn assembly 184 on the slide roller mechanism 182.

From the foregoing description, it will be apparent that the machine 100 and modifications thereof of the present invention provide a number of advantages, some of which have been described above and others of which are inherent in the invention.

Also it will be apparent that modifications can be made to the machine 100 and modifications thereof without departing from the teachings of the present invention.

Accordingly, the scope of the invention is only to be limited as necessitated by the accompanying claims.

I claim:

1. In a machine for gas-free sealing/welding of overlapping edges of thermoplastic material of the type which includes a framework carrying an ultrasonic transducer horn assembly having a hammer at a lower end thereof, an anvil positioned below the hammer, mounting means for mounting the framework for side-to-side movement, and drive means for moving the framework on the mounting means, the improvement residing in said mounting means comprising a beam which extends between spaced apart support members and which has two, parallel spaced, first and second, upper rail edges and at least one lower rail edge located beneath said first upper rail edge and wheel means rotatably mounted on said framework and including at least two upper wheels engaging said first upper rail edge and at least one lower wheel engaging said lower rail edge.

2. The machine of claim 1 wherein said wheel means further include two lower wheels engaging said lower rail edge.

3. The machine of claim 1 wherein each wheel has an outer periphery which has a concave V-shaped groove therein and each rail edge has a V-shaped convex cross section.

4. The machine of claim 1 wherein each wheel has an annular groove in the outer periphery thereof and defined between spaced apart rim formations, and two O-rings in said groove, each rail edge being adapted to engage an annular space between adjacent O-rings.

5. The machine of claim 1 wherein said wheel means comprise at least one additional upper wheel mounted on a stub shaft mounted to said framework and engaging said second upper rail edge.

6. The machine of claim 5 wherein said drive means comprise a motor mounted to said framework and having a shaft, and means coupling said shaft to said stub shaft.

7. The machine of claim 6 wherein said stub shaft is rotatably journalled to said framework, said wheel is fixed to said stub shaft and said coupling means comprise a pulley on said stub shaft, a pulley on said motor shaft and belt means mounted on said pulleys.

8. The machine of claim 6 wherein said wheel has an annular groove therein between spaced apart rim formations of said wheel and includes two O-rings in said groove with the annular area between adjacent O-rings receiving said second upper rail edge.

9. The machine of claim 1 wherein said drive means includes an elongate bar having a rack formation and being mounted to said beam, a motor mounted to said framework and having a shaft with a pinion gear mounted thereon and engaging said rack formation.

10. The machine of claim 1 wherein said beam is an I beam mounted on its side with a middle plate portion resting on said support members and transverse end portions of said I beam each having an upper rail edge and a lower rail edge, and said wheel means comprise at least two upper wheels and at least two lower wheels mounted to said framework and engaging, respectively opposite rail edges.

11. The machine of claim 10 wherein said wheels each have an annular groove which forms the periphery of each wheel with a concave, V-cross-section.

12. The machine of claim 10 wherein each rail edge is convex with a V-cross-section.

13. The machine of claim 1 wherein said anvil is fixed to and carried with said framework.

14. The machine of claim 1 including a roller slide mechanism mounted between said framework and said ultrasonic transducer horn assembly.

15. The machine of claim 14 including stop means for limiting downward movement of said horn assembly.

16. The machine of claim 15 wherein said stop means include a shock absorber.

17. The machine of claim 16 including means for adjusting the generally vertical position of said shock absorber for adjusting the distance between said hammer and said anvil.

18. The machine of claim 17 including indicia associated with said adjusting means for indicating the distance of said hammer above said anvil.

19. The machine of claim 15 including means for adjusting the vertical position of said stop means for adjusting the distance between said hammer and said anvil.

20. The machine of claim 1 wherein said motor is a stepper motor.

21. The machine of claim 20 wherein said stepper motor has a programmable step rate, a programmable step direction and a programmable number of steps.

22. The machine of claim 1 wherein said motor is a variable speed direct current motor.

23. In a machine for gas-free sealing/welding of overlapping edges of thermoplastic material of the type which includes a framework carrying an ultrasonic transducer horn assembly having a hammer at a lower end thereof, an anvil positioned below the hammer, mounting means for mounting the framework for side-to-side movement, drive means for moving the framework on the mounting means, and a roller slide assembly fixed to and between said framework and said horn assembly, the improvement residing in the provision of stop means for limiting the downward movement of said horn assembly, means for adjusting the generally vertical position of said stop means for adjusting the distance between said hammer and said anvil and indicia associated with said adjusting means for indicating the distance between said hammer and said anvil.

24. The machine of claim 23 wherein said stop means includes a shock absorber.

25. In a machine for gas-free sealing/welding of overlapping edges of thermoplastic material of the type which includes a framework carrying an ultrasonic transducer horn assembly having a hammer at a lower end thereof, an anvil positioned below the hammer, mounting means for mounting the framework for side-to-side movement, drive means for moving the framework on the mounting means, and a roller slide assembly fixed to and between said framework and said horn assembly, the improvement residing in the provision of stop means including a shock absorber for limiting movement of said hammer toward said anvil.

26. In a machine for gas-free sealing/welding of overlapping edges of thermoplastic material of the type which includes a framework carrying an ultrasonic transducer horn assembly having a hammer at a lower end thereof, an anvil positioned below the hammer, mounting means for mounting the framework for side-to-side movement, and drive means for moving the framework on the mounting means, the improvement residing in said mounting means comprising a beam which extends between spaced apart support members and which has at least one upper rail edge and at least one lower rail edge and wheel means rotatably mounted to said framework and including at least one upper wheel and at least one lower wheel which engage, respectively, said upper and lower rail edges, and each wheel has an annular groove in the outer periphery thereof and defined between spaced apart rim formations and has two O-rings in said groove, each rail edge being adapted to be received in the annular space between adjacent O-rings and to engage the O-rings.

* * * * *